July 18, 1950     N. A. TORNBLOM     2,516,096

DRAIN FITTING

Original Filed Oct. 11, 1944

Inventor:-
Nils A. Tornblom,
By Wm. F. Freudenreich,
Attorney.

Patented July 18, 1950

2,516,096

UNITED STATES PATENT OFFICE 2,516,096

DRAIN FITTING

Nils A. Tornblom, Chicago, Ill., assignor to Appleton Electric Company, a corporation of Illinois Original application October 11, 1944, Serial No. 558,213, now Patent No. 2,405,927, dated August 15, 1946. Divided and this application May 9, 1946, Serial No. 668,602

1 Claim. (Cl. 138—43)

This application is a division of my prior application, having the same title, Ser. No. 558,213, filed October 11, 1944, now Patent No. 2,405,927, August 15, 1946.

Water often collects in boxes of various kinds and conduits for wires in distributing systems for electricity and does harm if it is not removed. A simple little hole at a low point in a box to be drained will serve to permit water to escape but, in many situations, this expedient cannot be adopted because of fire hazard—flame as well as water being able to pass through such a hole. This has led to the creation of fittings which will permit the escape of water and yet be "flame tight." The most common type of such a fitting is based on the idea of a screw extending up through a wall at the bottom of a space to be drained and being such a loose fit that water can flow out along the threads. In order for such a device to be "flame tight" the escape passage must extend along many turns of the screw thread, the downward slope being so gradual that water does not flow freely and dirt entering the passage stays there instead of being washed away.

The object of the present invention is to produce a simple and novel "flame tight" drain fitting in which the principle of a helical outlet passage is utilized, but in such a manner that the escape path is relatively short and steep and permits a flow of water in relatively large volume.

Figure 1:
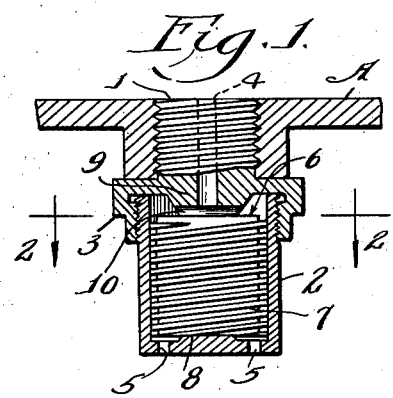
Figure 3:
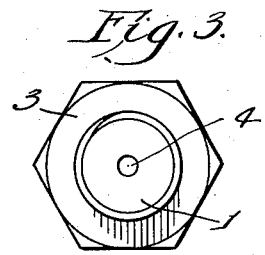
Figure 2:
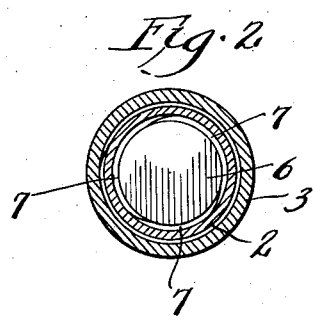
Figure 4:
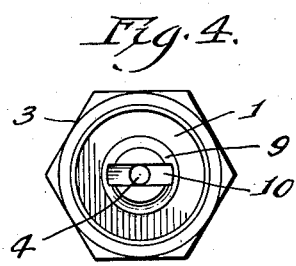

For a full understanding of the present invention and of its objects and advantages, reference may be had to the following detailed description taken in connection with the accompanying drawing, wherein:

Figure 1 is an axial section through a fitting embodying my invention, along with a fragment of a box to which the fitting is applied; Fig. 2 is a section on line 2—2 of Fig. 1; Fig. 3 is a top view of the fitting; and Fig. 4 is a bottom view of the upper member of the two part plug.

Referring to the drawings, 1 and 2 are the upper and lower members of a two part plug. The member 1 is a solid body having an upper part adapted to be screwed into a hub or downward projection on a box A; while the lower portion is in the form of an enlargement having an internally screwthreaded flange 3 on the under side. The member 2 is a cylindrical cup the open end of which is screwed into the lower end of member 1. The member 1 has a central hole 4 drilled through the same from top to bottom, and the member 2 has holes 5 in the bottom wall for the escape of water. A solid cylindrical part 6 fits slidably in the cup and is provided with external, multiple screw threads 7, a triple thread providing valleys about one thirty-second of an inch having been found satisfactory. The element 6 is preferably lightly clamped between the two members of the plug, the parts being so arranged, however, that water flowing down through the upper member of the plug can readily enter the upper ends of the valleys between the lands of the screw threads 7 and thereafter flow freely out of the lower ends of these valleys and drain out of the cup through the holes 5. In the arrangement shown, the cylindrical element rests on a central boss 8 on the bottom wall of the cup, thus providing an annular chamber or free space in the bottom of the cup above the holes 5 and below the lower ends of the valleys spiralling around the cylindrical element. Also, the upper member of the plug has at the bottom a central boss 9, contacting the top of the element 6 and provided in its under face with a wide, deep groove 10 extending diametrically across the same so as to be in communication with the lower end of the hole 4 in the upper member of the plug.

By using a triple thread, there is obtained the effect of a valley or passage having three times the cross sectional area afforded by the valley of a single thread and, furthermore, the pitch of the valleys is much steeper. This last characteristic is important because, in order to be explosion proof or "flame tight," must be of small area in cross section and, if the slope or pitch be too gradual, the water will bind in the valleys and will not drain away properly. Should foreign matter get into the valleys and clog the same, the cup need only be unscrewed to permit the element 6 to be removed and cleaned.

While I have illustrated and described with particularity only a single preferred form of my invention, I do not desire to be limited to the exact details thus illustrated and described, but intend to cover all forms and arrangements that come within the definitions of my invention constituting the appended claim.

I claim:

A drain fitting comprising a two-part plug composed of a body member and a cup member, the body member being adapted to be screwed into the bottom wall of a chamber to be drained and having on the under side a central boss substantially smaller in diameter than the interior of the cup member, the cup member having in the bottom a central boss substantially smaller in diameter than the cup, a solid cylindrical part fitting the inside of the cup member and engaged at its ends with said bosses, a drain passage extending axially through said body member and its boss, there being a transverse groove in the under face of the latter boss intersecting said drain passage, the cup member having outlets in the bottom beside the boss, and said cylindrical part having on the periphery screw threads extending from top to bottom.

NILS A. TORNBLOM.

REFERENCES CITED

The following references are of record in the file of this patent:

FOREIGN PATENTS

| Number | Country | Date |
|---|---|---|
| 236,876 | Germany | Nov. 14, 1909 |
| 437,344 | France | Apr. 18, 1912 |